United States Patent [19]
Jayarajan

[11] Patent Number: 5,085,921
[45] Date of Patent: Feb. 4, 1992

[54] DECORATIVE LAMINATES WITH HEAT RELEASE REDUCING AND INK DISCOLORATION PREVENTIVE PROTECTIVE LAYER

[75] Inventor: Jay A. Jayarajan, Renton, Wash.

[73] Assignee: The Boeing Company, Seattle, Wash.

[21] Appl. No.: 462,322

[22] Filed: Dec. 27, 1989

Related U.S. Application Data

[63] Continuation of Ser. No. 227,426, Jul. 29, 1988, abandoned, which is a continuation of Ser. No. 39,990, Apr. 20, 1987, abandoned.

[51] Int. Cl.$^5$ .................. B32B 3/18; B32B 15/08
[52] U.S. Cl. ................ 428/204; 156/219; 156/220; 156/288; 428/205; 428/209; 428/421; 428/463
[58] Field of Search .............. 428/444, 204, 246, 205, 428/209, 463, 421; 156/220, 219, 245, 288

[56] References Cited
U.S. PATENT DOCUMENTS

| 3,313,676 | 4/1967 | Kamal et al. | 161/189 |
|---|---|---|---|
| 3,369,959 | 2/1968 | Noyes | 161/189 |
| 3,397,108 | 8/1968 | Hecht et al. | 161/189 |
| 3,454,461 | 7/1969 | Paxton | 161/189 |
| 3,454,517 | 7/1969 | Neros et al. | 260/30.4 |
| 3,567,538 | 3/1971 | Lind | 156/154 |
| 3,616,192 | 10/1971 | Sinclair | 161/184 |
| 3,676,290 | 7/1972 | Hetrick | 161/189 |
| 3,679,510 | 7/1972 | Conley et al. | 156/245 |
| 3,701,711 | 10/1972 | Kelly | 161/214 |
| 3,734,807 | 5/1973 | Kelly et al. | 161/5 |
| 3,761,338 | 9/1973 | Ungar et al. | 156/219 |
| 3,814,647 | 6/1974 | Scher et al. | 156/219 |
| 3,857,723 | 12/1974 | Haskell et al. | 117/46 |
| 3,948,713 | 4/1976 | Cannady, Jr. | 156/220 |
| 3,997,696 | 12/1976 | Paisel et al. | 428/444 |
| 4,006,048 | 2/1977 | Cannady, Jr. et al. | 156/220 |
| 4,215,177 | 7/1980 | Strassel | 428/413 |
| 4,693,926 | 9/1987 | Kowalski et al. | 428/204 |
| 4,818,595 | 4/1989 | Ellis | 428/246 X |

Primary Examiner—Thomas J. Herbert
Attorney, Agent, or Firm—Christensen, O'Connor, Johnson & Kindness

[57] ABSTRACT

A process for creating decorative laminates comprising a resin based substrate layer, a barrier layer impermeable to the reaction products produced during the curing of the substrate resin and subsequent heating of the resultant laminate, and a decorative layer formed by a decorative ink pattern is disclosed. The barrier layer, which is located between the substrate layer and the decorative layer, prevents the reaction products from reaching the decorative ink pattern when the substrate resins are cured during laminate processing, and, during subsequent heating of the final product, acts as a sink for heat stress and prevents combustible toxic gases from passing through the laminate into the surrounding environment. Thus, destructive of the decorative ink pattern during laminating processing is prevented. Further, the resulting decorative laminates have high heat release thresholds and reduce the risk of flashover in enclosed areas.

46 Claims, 1 Drawing Sheet

DECORATIVE LAMINATES WITH HEAT RELEASE REDUCING AND INK DISCOLORATION PREVENTIVE PROTECTIVE LAYER

This application is a continuation of application Ser. No. 227,426, filed July 29, 1988, which is a continuation of application Ser. No. 039,990, filed Apr. 20, 1987, both now abandoned.

TECHNICAL AREA

This invention relates to decorative laminates and, more particularly, to decorative laminates that include a rigidity imparting and/or an embossment retaining substrate layer, partially formed of a curable resin, and a decorative layer.

BACKGROUND OF THE INVENTION

Decorative laminates are widely used as surfacing materials for walls, countertops, furniture and other structures, such as aircraft interior panels. Decorative laminates are used in such structures because they can simulate the appearance of many materials, such as wood, and because laminates are capable of being molded and embossed to provide a three-dimensional surface. Decorative laminates are formed by a plurality of layers that include a substrate layer, a decorative layer that overlies the substrate layer and a protective layer that overlies the decorative layer. Other layers may be included between the substrate, decorative and protective layers in specific decorative laminates, depending upon the nature of the materials used and the desired laminate characteristics, e.g., flat or embossed. Laminates that are flat or have a single contour are known as "rigid laminates." Laminates with two or more contours are known as "flexible laminates." Both rigid and flexible laminates are embossable.

In recent years, the substrate layers of aircraft interior panel rigid decorative laminates have been formed of epoxy resin composites. Structurally, such rigid panels include decorative ink patterns or decorative sheets (e.g., a decorative layer) located between an epoxy resin composite substrate layer and a protective layer formed of a suitably transparent material such as polyvinyl fluoride. The substrate layers of flexible laminates have been formed of embossable films which have high smoke and heat release characteristics due to the nature of the resins used (e.g., polyesters). Structurally, the flexible panels are equivalent to the rigid panels with the exception of the substrate layer.

Decorative laminates that include epoxy resin composite and embossable film substrates are advantageous because they are economical both in terms of material cost and processing complexity. Such decorative laminates have the further advantage that they maintain a high decorative quality during the lamination process, partially due to the fact that reaction products, created when the epoxy resin in the substrate layer is cured, are minimal and do not have a disrupting effect on either the decorative pattern or the outer protective film. The high decorative quality of decorative laminates and their conformance to previously existing safety standards attributed to their past popular use in the industry.

Recently, the Federal Aviation Administration (FAA) has amended the Federal Aviation Regulations (FAR) to increase the certification requirements for compartment interiors for carriers with at least a 20 passenger capacity. Two FAR sections have been amended to tighten the heat release standards for interior components, such as partition, ceiling and wall panels, and the outer surfaces of galleys, large cabinets, and stowage compartments.

The new FAA certification requirements upgrade the heat release over a period of time and peak rate heat release criteria used to evaluate materials to be used in the interior of aircraft. A sample piece of a component, with laminate attached, generally 150 mm$^2$, is hung vertically and its decorative surface is exposed to a heat release apparatus that emulates the radiant heat present in a post-crash environment. Each sample piece is tested three times for five minutes. This is referred to as the Ohio State University ("OSU") test. The acceptance criteria have been changed from a total release of 100 kilowatt-minute per square meter over the first two minutes to 65 kilowatt-minute per square meter, and from a peak rate heat release of 100 kilowatts per square meter to 65 kilowatts per square meter. The peak level was adopted to prevent the use of materials which have relatively low levels of total heat release but which emit a large amount of heat over a short duration. The FAA asserts that inherent in these heat release standards are limitations on smoke and toxic emissions due to the significant known correlation between those characteristics and flammability characteristics. One aspect of the correlation between toxic emissions and flammability in closed areas relates to the onset of "flashover." Flashover is the combustion of high levels of combustible toxic emissions within an enclosed or partially enclosed area. Thus, an increase in flammability requirements implies a reduction in toxic emissions and a delay in the onset of flashover.

Epoxy resin based laminates were subjected to testing during the FAA rulemaking period. It was determined that the continued use of existing epoxy or polyester resin based laminates was undesirable because, when heated, such laminates do not meet the stricter heat release criteria. Another previously known disadvantage of epoxy resin based laminates not addressed by the FAA is their emission of large amounts of smoke and toxic gas during heat stress. Even though this aspect of epoxy resin based laminates was not addressed by the FAA, it is desirable that any solution to the epoxy resin heat release failure problem also address the smoke and toxic gas problem.

In addition to testing epoxy resin based laminates during its rule making process, the FAA also tested phenolic resin based laminates. The results of the tests led the FAA to the conclusion that certain phenolic resin based laminates would meet the new standards. Because ways of creating phenolic resin composite substrates were known in the heat and pressure laminate art, the only change to existing laminate producing methods foreseen was a change in the type of resin used in the substrate layer. No major problems in the relationships between the resin and other laminate materials were expected. (An additional advantage not noted by the FAA is that phenolic resin based laminates do not emit large amounts of smoke and toxic gas when heated.) Unfortunately, the FAA's presumption regarding the ability to produce commercially acceptable decorative laminates with phenolic resin based substrates using existing methods has proven to be incorrect. During curing, phenolic resins release a large amount of condensation reaction products such as water and formaldehyde, in addition to a residual quantity of free phenols. These reaction products attack decorative ink pigments, causing the ink to discolor, resulting in the deterioration of their decorative quality. Changes in the type of phenolic resin only affect the degree of deterioration, not the occurrence of deterioration. Thus, while the phenolic resin based laminates may meet the new FAA heat release standards, commercially acceptable decorative laminates that include a phenolic resin based substrate cannot be created by simply substituting a phenolic resin for an epoxy resin in existing methods of creating decorative laminates.

In summary, prior epoxy resin based decorative laminates no longer comply with the FAA heat release standards. While phenolic resin based decorative laminates created in the same manner as prior epoxy resin based decorative laminates meet the new FAA heat release standards, such phenolic resin based decorative laminates are commercially unacceptable because when phenolic resins are cured, they produce reaction products that discolor the ink used to create decorative patterns and, thus, destroy the decorative patterns. This invention is directed to providing high quality (e.g., commercially acceptable) decorative laminates that meet the new FAA heat release standards.

SUMMARY OF THE INVENTION

In accordance with this invention, the problems of excessive heat release from aircraft interior components under heat stress and of decorative ink bleeding and discoloration during decorative laminate production is solved in a practical and economical manner by providing a barrier layer between the substrate layer and the decorative layer of the laminate. The barrier layer is impermeable to the reaction products that are created when substrate resin is cured during the lamination process. The barrier layer also acts as a heat sink and forms an impenetrable barrier against combustible toxic gases emitted from the interior or substrate surface of aircraft interior components if the components are subjected to heat stress when in use. The barrier layer is impenetrable to these gases relative to the environment in which the gases are being released, i.e., the barrier layer can slow the release of the combustible toxic gases through the laminate and thereby reduce the onset of flashover. Without this barrier, the volatile toxic gases would rapidly become fuel for any combustion in progress.

More specifically, the invention is directed to an improved process for creating decorative laminates that generally comprises the steps of: (i) forming a sandwich including, from bottom up, a substrate layer that includes a curable resin, an ink based decorative layer positioned atop the substrate layer and a protective outer layer positioned atop the decorative layer; and, (ii) curing said curable resin by applying heat and pressure to the sandwich, said curing step possibly resulting in the creation of reaction products that can destroy the integrity of the decorative layer by causing the ink used to create the decorative layer to run and discolor. The improvement comprises the step of adding a barrier layer to said sandwich between the decorative layer and the substrate layer. If other layers are located between the decorative layer and the substrate layer, the barrier layer is positioned as close to the decorative layer as possible. The barrier layer includes a sheet of protective material that: (i) is impermeable to the reaction products created when a curable resin, that destroys the integrity of the decorative ink pattern by causing the ink to discolor (such as a phenolic resin), is cured, and (ii) acts as a heat sink and forms an impenetrable barrier to toxic gases when the resulting laminate is subjected to high temperatures. The preferred protective material is a thin aluminum foil. The invention is also directed to the products created by the improved process.

In accordance with further aspects of this invention, the preferred barrier layer has the following properties: (i) without requiring extensive additional adhesive materials or manufacturing steps, it adheres to the substrate layer and the decorative layer during the lamination process; (ii) it is impermeable to the reaction products created when the curable substrate is cured; (iii) its heat sink ability and impenetrability act as a barrier to slow the release of heat and gases through the laminate toward the protective outer layer when the resultant decorative laminate is subjected to high temperatures; (iv) it adds a minimum amount of weight and volume to the resultant decorative laminate; and, (v) it does not affect the decorative quality of the laminate.

In accordance with further aspects of this invention, the method of creating the decorative layer is independent of the nature of the barrier layer. If the decorative layer is created by printing, the decorative layer can be created by printing a decorative pattern directly onto the side of the barrier layer that faces the protective layer, if the facing side of the barrier layer is formed of a material that is conducive to direct printing. If the facing side of the barrier layer is not conducive to direct printing, the barrier layer can be modified by coating it with a thin layer of a material that is conducive to direct printing, such as polyvinyl fluoride. This eliminates the need to adopt a reverse printing process, i.e., printing on the inner surface of the protective outer layer, which is another option, and is advantageous if direct printing is already being practiced. In this way, the invention can be practiced without requiring that a new printing procedure be adopted.

As will be readily appreciated from the foregoing description, the invention avoids the commercial and aesthetic disadvantages associated with the production of a decorative laminate that includes a substrate layer impregnated with a resin that creates reaction products that destroy the integrity of decorative inks when cured. The invention has the further advantage of decreasing the heat release levels in decorative laminates by acting as a heat sink and reducing the heat released from the outer face of the decorative laminate when the laminate is exposed to heat stress. It has been found that this heat sink benefit allows laminates that include epoxy resin impregnated substrates to meet the new FAA heat release standards. Unfortunately, the barrier layer does not completely eliminate the emission of a large amount of smoke and gas during heat stress occurring after curing. Because the barrier layer can be formed of a lightweight material, e.g., aluminum coated with a thin film of printable material, if necessary, the barrier layer has a minimal effect on the weight and manageability of the resulting decorative laminate. Thus, decorative laminates that include a barrier layer formed in accordance with the invention can be readily used to replace laminates currently in use that do not meet the new FAA heat release regulations.

BRIEF DESCRIPTION OF THE DRAWINGS

The foregoing and other features and advantages of this invention will become more readily appreciated as the same becomes better understood by reference to the following description of preferred embodiments of the invention when taken in conjunction with the accompanying figures wherein.

DESCRIPTION OF THE PREFERRED EMBODIMENTS

Figure 1:
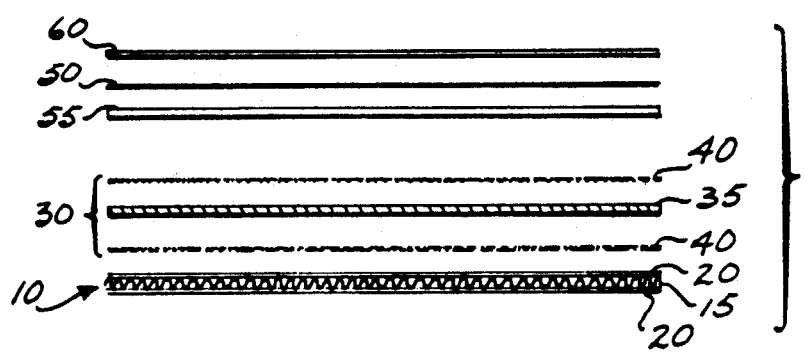
FIG. 1 is a pictorial diagram illustrating a rigid laminate formed in accordance with this invention.

In accordance with the invention, a high quality decorative laminate having an absence of decorative ink discoloration when being created and low heat release under heat stress when being used is produced by incorporating a barrier layer between the substrate layer of the laminate and the decorative ink layer of the laminate. Many varieties of resin impregnable fibrous material and many manners of construction, all well known by those skilled in the decorative laminate art, can be used to create the substrate layer. The choice of resin impregnable fibrous material and the manner of construction primarily depend on the desired rigidity of the resulting laminate. Glass and paper fibers are often chosen when an inexpensive, relatively rigid laminate is desired. Such fibers are capable of imparting rigidity to a decorative laminate, while at the same time allowing the laminate to maintain a molded design or embossment. As illustrated in FIG. 1, the substrate layer 10 of a rigid decorative laminate formed in accordance with the invention may comprise a corrugated core 15 sandwiched between two planar plies 20. Both the corrugated core 15 and the planar plies 20, or just the plies, may be formed of a fibrous material impregnated with resin. When minimal strength is required, the chosen fibrous material may be paper. When greater strength and rigidity are required, more exotic fabrics, such as glass, graphite and Kevlar fibers can be chosen. Further, the core may be solid or perforated, rather than corrugated. Or the core may be formed of a blanket of plies, or be a honeycomb layer. In any event, some or all of the core layers are impregnated with a curable resin. Depending upon processing procedures, the resin may be partially cured before other layers are added to the substrate layer 10.

The substrate layer 10 comprises the base of the decorative laminate. Located atop the substrate layer 10 is a barrier layer 30. As illustrated in FIG. 1, the barrier layer 30 can be a sublaminate made up of a plurality of sheets. The sheets include a sheet of protective material 35 sandwiched between two sheets of film 40. The sheet of protective material 35 is preferably made of aluminum, i.e., the protective sheet of material is a sheet of aluminum foil, preferably having a thickness of about 0.001 inches. Aluminum is preferred because it is inexpensive and readily available commercially in a wide variety of thicknesses, widths, alloys, tempers, finishes, surface treatments and, in some cases, coated with various types of adhesive and/or film, including polyvinyl fluoride film.

While the preferred material used for the sheet of protective material 35 is aluminum, other metals, plus various ceramics and composite materials, can be used, if desired. Obviously, in addition to providing a barrier that is impermeable to the reaction products that are created when the substrate resin is cured, the chosen material must be compatible with the ultimate use of the decorative laminate. For example, if the decorative laminate is to be molded during the heat and pressure lamination processes, or by post-formation techniques, the barrier layer material(s) must be moldable. In some instances, the chosen barrier layer material(s) may be required to impart added rigidity to the laminate. The acceptable thickness, weight and manageability of the resulting laminate are all factors that must be considered when choosing the barrier layer material(s).

The two sheets of film 40 are actually coatings on the sheet of protective material 35. One purpose of applying the coatings is to serve as a decorative cover. For example, integrally colored polyvinyl fluoride film can be used. Another purpose is to allow a decorative pattern to be directly printed onto the surface of the barrier layer 30, if desired. If no such printing is desired, the coatings can be eliminated, unless needed for an adhesive or for other reasons dictated by the materials used to form other layers and/or the specific lamination process being used. If printing on the barrier layer is desired, obviously, one of the requirements of the sheet of film 40 that is to receive the printing, i.e., the sheet of film on the side of the sheet of protective material remote from the substrate layer 10, is that it have the ability to receive a decorative pattern using the desired print technique; for example, screen printing. The sheets of film 40 should also: (i) be joinable to their adjacent layers during the lamination process; (ii) add minimum weight and volume to the resultant decorative laminate; and, (iii) not affect the decorative quality of the laminate. When the sheet of protective material is aluminum foil, the preferred film is a polyvinyl fluoride film with thickness on the order of $10^{-3}$ inches. Applying a polyvinyl fluoride film to both sides of aluminum foil has the advantage of facilitating the uniform processing of the barrier layer 30 during the lamination process. More specifically, it has been found that when polyvinyl fluoride film is applied to only one side of aluminum foil, the resulting barrier layer is subject to wrinkling due to the occurrence of nonuniform shrinkage when the combination is dried after the printing step is finished. Thus, a high quality of decorative laminate is not produced. The inclusion of a polyvinyl fluoride film on both sides of the aluminum foil eliminates nonuniform shrinkage and the wrinkling resulting therefrom, plus enhances the handleability of the barrier layer.

While a decorative layer can be printed directly onto the film 40 of the barrier layer 30 on the side of the sheet of protective material 35 that faces away from the substrate layer 10, more preferably, the decorative layer 50 is printed onto a base sheet of material, such as a sheet of polyvinyl fluoride 55 that may be two (2) mils thick, for example. The protective outer layer 60 of the decorative laminate is positioned on the opposite side of the decorative layer 50 from the base sheet 55. Preferably, the protective outer layer 60 is also formed of polyvinyl fluoride. The protective outer layer may be formed by polyvinyl fluoride film one (1) mil thick, for example. The degree of opacity in the protective layer polyvinyl fluoride film can vary from substantially transparent to almost dark, depending upon the aesthetics of the environment in which a decorative laminate formed in accordance with this invention is to be used. Obviously, the chosen opacity must allow the decorative pattern to be visible. Polyvinyl fluoride is preferred because of its physical toughness, chemical inertness, abrasion and soil resistance, and consistency of character regardless of temperature changes. Various polyvinyl fluoride films used to cover the decorative layers of laminates are known. See, for example, U.S. Pat. No. 3,397,108, which discloses a combination of polyvinyl fluoride and inorganic particle materials; U.S. Pat. No. 3,734,807, which discloses a combination of polyvinyl fluoride polymers of a certain polymerizable benzophenones; and, U.S. Pat. No. 3,340,137, which discloses a weather-resistant decorative laminate that is surfaced with a substantially transparent top film of adherably polyvinyl fluoride.

The ink used to form the decorative layer 50 is preferably an organic ink or paint. As noted above, the decorative ink can be directly printed onto the surface of a base sheet 55, or onto the upper (as shown) surface of the barrier layer 30, if the material used to form the upper surface is suitable for printing. Alternatively, the decorative ink can be reverse printed onto the interior surface of the protective layer 60, i.e., the surface of the protective layer 60 that faces the barrier layer 30. While screen printing is preferred, other methods of printing or imparting a decorative image can be used, including: laser screen printing; stenciling; ultraviolet electronic beam printing; flexographic silk screening; and the incorporation of a photograph or print.

Preferably, the substrate layer 10, the barrier layer 30 and an outer layer formed by the decorative layer 50 and the protective outer layer 60 (unless the decorative layer is created on the barrier layer) are formed separately prior to being assembled in the manner illustrated in FIG. 1 and described above. After the laminate layers are assembled, they are laminated, i.e., consolidated by heat and pressure into a unitary decorative laminate. The lamination machine may include a mechanism for applying a matte finish to the outer surface of the laminate, if desired; or, a mirror polish may be applied to the outer surface. In any event, during lamination, the reaction products emitted by the substrate layer 10, as the substrate resin is cured, are precluded by the barrier layer 30 from reaching the decorative layer 50 and destroying the integrity of the ink used to form the decorative layer. Thus, ink does not discolor or change in some other way that disrupts the decorative pattern. Further, post-lamination processes are not affected by the addition of an appropriately chosen barrier layer.

During actual use of the decorative laminate, the barrier layer minimizes the heat released during combustion of the laminate and the underlying components to which it is attached as measured in the OSU heat release test. The barrier minimizes the heat release by: (i) acting as a heat sink; and (ii) forming an impenetrable barrier against combustible toxic products released by the heating, thereby reducing the contribution of those gases to the flammability of the surrounding area.

Figure 2:
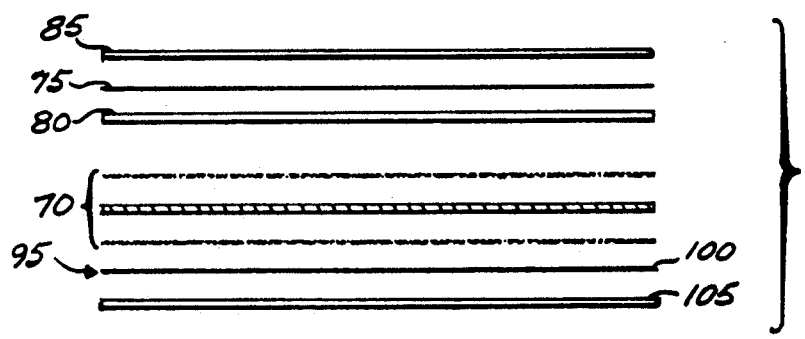
FIG. 2 is a pictorial diagram illustrating a flexible laminate formed in accordance with this invention.

FIG. 2 illustrates a flexible decorative laminate formed in accordance with this invention. The flexible decorative laminate embodiment of the invention illustrated in FIG. 2 includes a barrier layer 70, a decorative layer 75 supported by a base sheet 80 and a protective outer layer 85 similar to the same elements described in conjunction with FIG. 1. The major difference between FIGS. 1 and 2 is that the substrate layer 95 in FIG. 2 is made up of a resinous embossable film 100 rather than a core sandwiched between resin impregnated plies. The substrate 95 may also include additional layers of thermoplastic films as well as other embossable or rigidity imparting layers and sheets. The end result is a flexible decorative laminate as opposed to a rigid decorative laminate. The substrate 95 is affixed to a base 105 by a suitable adhesive material after the flexible decorative laminate is produced. Flexible decorative laminates including embossable films made with epoxy or polyester resins (as opposed to phenolic resins) can be structured to meet the new FAA heat release criteria if they include a barrier layer formed in accordance with the invention.

As in the case of the rigid decorative laminate illustrated in FIG. 1, the flexible decorative laminate illustrated in FIG. 2 is assembled with the barrier layer 70 sandwiched between the substrate layer 95 and the decorative layer 75. As with the rigid decorative laminates, flexible decorative laminates can have various finishes imparted to them. The final product, a flexible decorative laminate, has decreased heat release levels in comparison to a similar laminate without the barrier layer.

As will readily be appreciated from the foregoing description, the invention provides decorative laminates that are high in decorative quality and meet the FAA heat release requirements. The invention provides a way of producing phenolic resin based decorative laminates that: (i) have a high decorative quality; (ii) meet the new FAA heat release requirements; and, (iii) do not produce large amounts of toxic gases and smoke when subjected to post-lamination heat stress. Epoxy or polyester resin based decorative laminates, made in accordance with this invention, have a high decorative quality and meet the new FAA heat release requirements.

While preferred embodiments of this invention have been illustrated and described, it will be appreciated that various changes can be made therein without departing from the spirit and scope of the invention. For example, as noted above, various materials other than aluminum can be used to form the barrier layer, depending on costs, weight and production limitations. Hence, the invention can be practiced otherwise than as specifically described herein.

The embodiments of the invention in which an exclusive property or privilege is claimed are defined as follows:

1. In a decorative laminate formed of a rigidity imparting substrate layer and a decorative layer formed by a decorative ink, said decorative laminate including one or more resinous layers including a curable resin that, when cured, creates reaction products that could destroy the integrity of said decorative ink by causing said decorative ink to discolor, said decorative laminate being formed by a heat and pressure laminating process, the improvement comprising a barrier layer that (i) is impermeable to said reaction products created when said curable resin is cured that could destroy the integrity of said decorative ink, (ii) is located in said decorative laminate such that said decorative layer lies on one side of said barrier layer and all resinous layers that create said reaction products when said curable resin is cured lie on the other side of said barrier layer, and (iii) forms a heat sink once the decorative laminate is used after said resin is cured.

2. The improved decorative laminate claimed in claim 1, wherein said substrate layer is a fiber reinforced epoxy resin composite.

3. The improved decorative laminate claimed in claim 1, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

4. The improved decorative laminate claimed in claim 3, wherein said thermoplastic film is a polyvinyl fluoride film.

5. The improved decorative laminate claimed in claim 3, wherein said sheet of protective material is a sheet of aluminum foil.

6. The improved decorative laminate claimed in claim 5, wherein said thermoplastic film is a polyvinyl fluoride film.

7. The improved decorative laminate claimed in claim 6, wherein said barrier layer further includes a layer of polyvinyl fluoride film coated on each surface of said sheet of aluminum foil.

8. The improved decorative laminate claimed in claim 1, wherein said substrate layer is a fiber reinforced phenolic resin composite.

9. The improved decorative laminate claimed in claim 8, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

10. The improved decorative laminate claimed in claim 9, wherein said thermoplastic film is a polyvinyl fluoride film.

11. The improved decorative laminate claimed in claim 9, wherein said sheet of protective material is a sheet of aluminum foil.

12. The improved decorative laminate claimed in claim 11, wherein said thermoplastic film is a polyvinyl fluoride film.

13. The improved decorative laminate claimed in claim 12, wherein said barrier layer further includes a layer of polyvinyl fluoride film coated on each surface of said sheet of aluminum foil.

14. The improved decorative laminate claimed in claim 1, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

15. The improved decorative laminate claimed in claim 14, wherein said thermoplastic film is a polyvinyl fluoride film.

16. The improved decorative laminate claimed in claim 14, wherein said sheet of protective material is a sheet of aluminum foil.

17. The improved decorative laminate claimed in claim 16, wherein said thermoplastic film is a polyvinyl fluoride film.

18. The improved decorative laminate claimed in claim 17, wherein said barrier layer further includes a layer of polyvinyl fluoride film coated on each surface of said sheet of aluminum foil.

19. The improved decorative laminate claimed in claim 2, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

20. The improved decorative laminate claimed in claim 19, wherein said thermoplastic film is a polyvinyl fluoride film.

21. The improved decorative laminate claimed in claim 19, wherein said sheet of protective material is a sheet of aluminum foil.

22. The improved decorative laminate claimed in claim 21, wherein said thermoplastic film is a polyvinyl fluoride film.

23. The improved decorative laminate claimed in claim 22, wherein said barrier layer further includes a layer of polyvinyl fluoride film coated on each surface of said sheet of aluminum foil.

24. In a process for creating a decorative laminate comprising the steps of: (i) forming a sandwich including a rigidity imparting substrate layer, a decorative layer that includes a decorative pattern formed by a decorative ink, and one or more resinous layers including a curable resin; and (ii) curing said curable resin by applying heat and pressure to the sandwich, said curing step resulting in the creation of reaction products by said curable resin that could destroy the integrity of said decorative ink by causing the ink to discolor, the improvement comprising the step of adding, prior to the step of curing said curable resin, a barrier layer that (a) is impermeable to said reaction products created when said curable resin is cured that could destroy the integrity of said decorative ink to said sandwich such that said decorative layer lies on one side of said barrier layer and all resinous layers that create said reaction products when said curable resin is cured lie on the other side of said barrier layer and (b) forms a heat sink when said decorative laminate is used after said resin is cured.

25. The improved process for creating a decorative laminate claimed in claim 24, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

26. The improved process for creating a decorative laminate claimed in claim 25, wherein said thermoplastic film is a polyvinyl fluoride film.

27. The improved process for creating a decorative laminate claimed in claim 25, wherein said sheet of protective material is a sheet of aluminum foil.

28. The improved process creating a decorative laminate claimed in claim 27, wherein said thermoplastic film is a polyvinyl fluoride film.

29. The improved process for creating a decorative laminate claimed in claim 28, wherein said barrier layer further includes a polyvinyl fluoride film coated on each surface of said sheet of aluminum foil.

30. The improved process for creating a decorative laminate claimed in claim 24, wherein said substrate layer is a fiber reinforced phenolic resin composite.

31. The improved process for creating a decorative laminate claimed in claim 30, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

32. The improved process for creating a decorative laminate claimed in claim 31, wherein said thermoplastic is a polyvinyl film.

33. The improved process for creating a decorative laminate claimed in claim 31, wherein said sheet of protective material is a sheet of aluminum foil.

34. The improved process for creating a decorative laminate claimed in claim 33, wherein said thermoplastic film is a polyvinyl fluoride film.

35. The improved process for creating a decorative laminate claimed in claim 34, wherein said barrier layer further includes a layer of polyvinyl fluoride film coated on each surface of said sheet of aluminum foil.

36. The improved process for creating a decorative laminate claimed in claim 24, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

37. The improved process for creating a decorative laminate claimed in claim 36, wherein said thermoplastic film is a polyvinyl fluoride film.

38. The improved process for creating a decorative laminate claimed in claim 35, wherein said sheet of protective material is a sheet of aluminum foil.

39. The improved process for creating a decorative laminate claimed in claim 38, wherein said thermoplastic film is a polyvinyl fluoride film.

40. The improved process for creating a decorative laminate claimed in claim 39, wherein said barrier layer further includes a layer of polyvinyl fluoride film coated on each surface of said sheet of aluminum foil.

41. The improved process for creating a decorative laminate claimed in claim 24, wherein said substrate layer is a fiber reinforced epoxy resin composite.

42. The improved process for creating a decorative laminate claimed in claim 41, wherein said barrier layer includes a sheet of protective material that is impermeable to said reaction products created when said curable resin is cured that could destroy the integrity of said decorative ink by causing said decorative ink to discolor and wherein the decorative laminate includes an exposed outer layer on the opposite side of said decorative layer from said barrier layer, the surface of said exposed outer layer opposite the decorative layer forming the exposed outer surface of the decorative laminate, said exposed outer layer comprising a thermoplastic film.

43. The improved process for creating a decorative laminate claimed in claim 42, wherein said thermoplastic film is a polyvinyl fluoride film.

44. The improved process for creating a decorative laminate claimed in claim 42, wherein said sheet of protective material is a sheet of aluminum foil.

45. The improved process for creating a decorative laminate claimed in claim 44, wherein said thermoplastic film is a polyvinyl fluoride film.

46. The improved process for creating a decorative laminate claimed in claim 45, wherein said barrier layer further includes a layer of polyvinyl fluoride film coated on each surface of said sheet of aluminum foil.

* * * * *

UNITED STATES PATENT AND TRADEMARK OFFICE
CERTIFICATE OF CORRECTION

PATENT NO. : 5,085,921
DATED      : February 4, 1992
INVENTOR(S) : Jay A. Jayarajan It is certified that error appears in the above-identified patent and that said Letters Patent is hereby corrected as shown below:

* In the Abstract:

| COLUMN | LINE | ERROR |
|---|---|---|
| [57]* | 15 | "destructive" should read --destruction-- |
| 11 | 9 | after "includes a" insert --layer of-- |
| 12 | 9 | "Claim 35" should read --Claim 36-- |
| [56] | 16th Ref. | "3,997,696 12/1976 Paisel et al." should read --3,997,696 12/1976 Paisle et al.-- |

Signed and Sealed this

Eighteenth Day of May, 1993

Attest:

MICHAEL K. KIRK

*Attesting Officer*     *Acting Commissioner of Patents and Trademarks*